July 17, 1962         G. R. FERGUSON         3,044,574
AIR LINE LUBRICATOR WITH MEASURED LUBRICATION
Filed Sept. 1, 1961                                    2 Sheets-Sheet 1
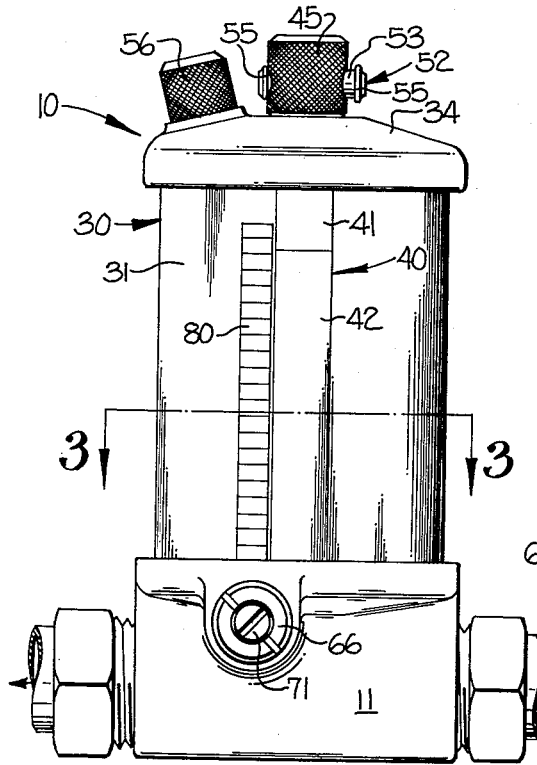
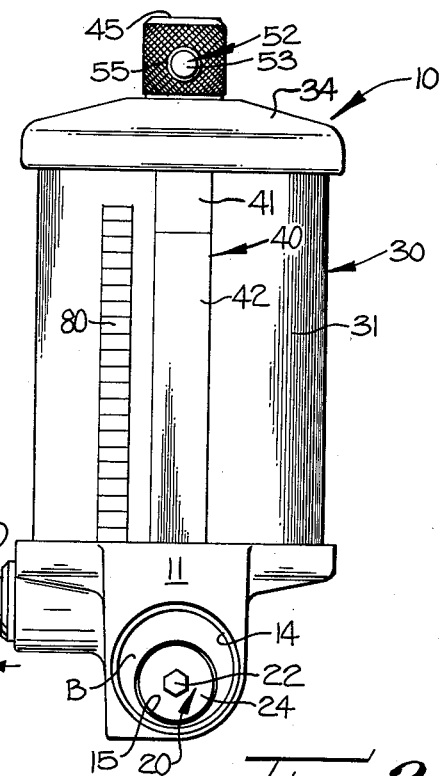
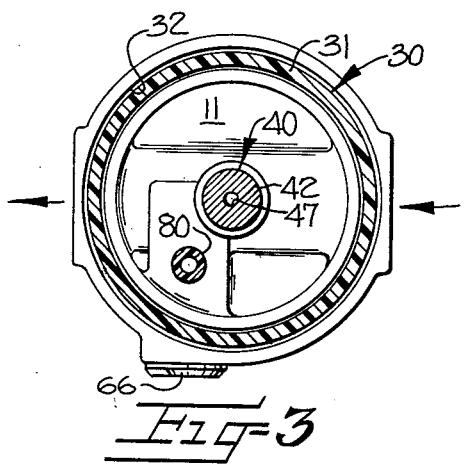
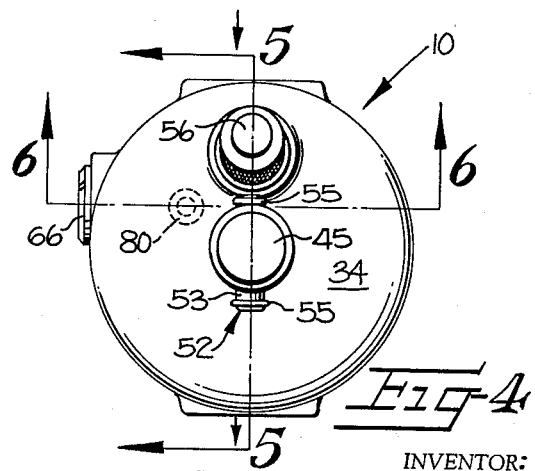
INVENTOR:
GEORGE R. FERGUSON
BY Eaton, Bell, Hunt & Seltzer
ATTORNEYS July 17, 1962 G. R. FERGUSON 3,044,574
AIR LINE LUBRICATOR WITH MEASURED LUBRICATION
Filed Sept. 1, 1961 2 Sheets-Sheet 2
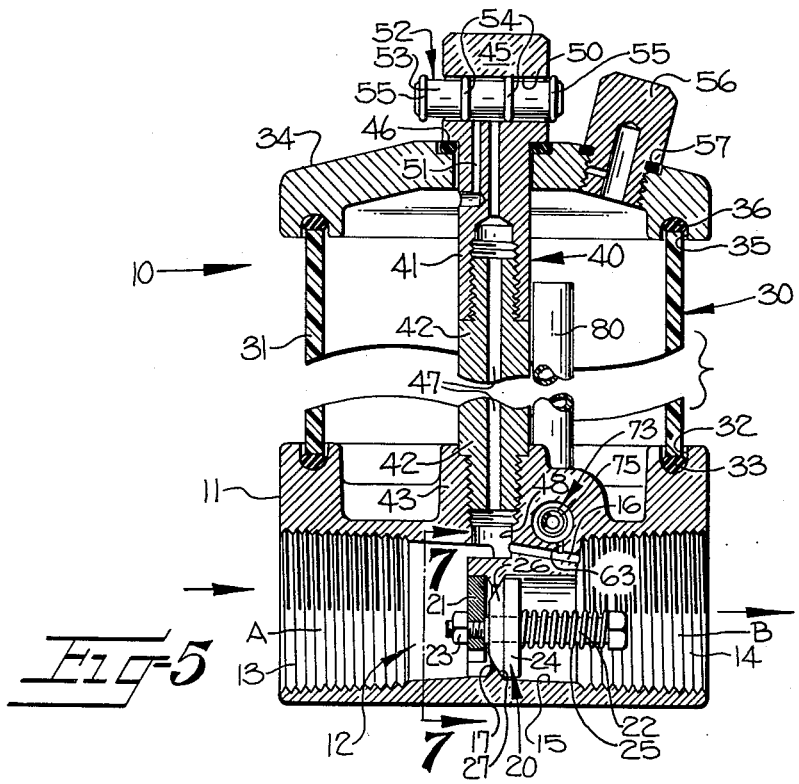
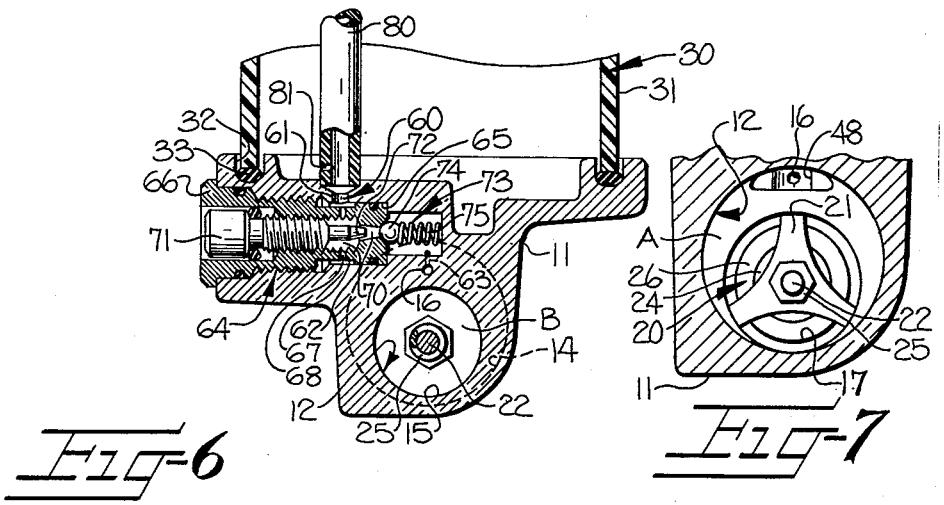
INVENTOR:
GEORGE R. FERGUSON
BY Eaton, Bell, Hunt & Seltzer
ATTORNEYS United States Patent Office 3,044,574
Patented July 17, 1962

3,044,574
AIR LINE LUBRICATOR WITH MEASURED LUBRICATION
George R. Ferguson, Clover, S.C., assignor to Perfecting Service Company, Charlotte, N.C., a corporation of North Carolina
Filed Sept. 1, 1961, Ser. No. 135,556
6 Claims. (Cl. 184—55)

This invention relates generally to a device for introducing a liquid in atomized or droplet form into a flowing fluid medium under pressure, wherein the rate at which the liquid is being introduced into the flowing fluid medium is visually indicated and can be adjusted to compensate for excessive or inadequate introduction of liquid. More particularly, the present invention is directed to an air line lubricator for introducing lubricant in mist form into a line through which compressed air is being passed of the type utilizing the flow of the compressed air past a lubricant discharge line for creating a suction effect in the discharge line communicating with a lubricant-containing reservoir to draw lubricant mist into the air line, and to a visible indication of the rate at which lubricant mist is being drawn into the air line for determining the necessity of adjusting the rate at which lubricant mist is added to the compressed air.

Devices for treating a flowing fluid medium, such as compressed air with a liquid, such as a lubricating oil, are commonly employed in the operation of equipment powered by fluid pressure, such as pneumatic drills, and other rotary and reciprocatory tools. Thus, in the use of a pneumatic tool, compressed air serves as the source of power for operating the moving parts of the tool, while the lubricant mist dispersed therein coats the moving parts of the tool where friction is apt to be severe, thereby reducing wear and over-heating of these parts caused by excessive friction therebetween.

It has proved to be difficult to accurately estimate the correct adjustment of a device of the character described for discharging a proper quantity of lubricant mist into the compressed air for operating such power equipment to provide effective lubrication thereof. In the latter respect, the admission of an excessive amount of lubricant mist into the compressed air tends to cause the accumulation of an undue amount of lubricant on the moving parts of the power equipment, in which foreign matter, such as abrasive pieces of grit or chips, from the object being operated upon by the power equipment collects. This sticky mixture of lubricant and foreign matter forms a highly abrasive gritty residue likely to foul the moving parts of the power equipment and to inflict extreme wear thereon. Moreover, the excess lubricant often drips or leaks from the power equipment to form unsightly stains about the premises. On the other hand, the introduction of an insufficient amount of lubricant mist into the compressed air results in inadequate lubrication of the movable parts of the power equipment, causing excessive friction leading to increased wear and over-heating. Under such circumstances, the power equipment may fail and in any event is likely to require frequent repairs.

It is accordingly a primary object of the present invention to provide a device for dispensing a liquid, such as a lubricant, in mist or droplet form from a reservoir into a flowing fluid medium under pressure, such as compressed air, which includes a visible gauge for indicating the rate at which the liquid is dispersed into the flowing fluid medium, and a liquid discharge line leading from the reservoir having a regulated restriction for adjusting the rate of liquid dispersal to correct for any excessive or inadequate amount of lubricant dispersed into the flowing fluid medium.

It is another more specific object of this invention to provide a device for dispensing liquid lubricant in mist or droplet form from a lubricant reservoir into a line through which compressed air is flowing, the device having a vertical metering tube disposed in the reservoir and associated with a lubricant discharge line leading from the reservoir. Lubricant from the reservoir is adapted to flow through the metering tube into the compressed air line for creating a differential liquid level between a higher level of lubricant in the reservoir and a lower level of lubricant in the tube for providing visual indication of the rate at which lubricant from the reservoir is being introduced into the compressed air line. The device further includes an adjustable restrictor valve interposed in the lubricant discharge line between the vertical metering tube and the compressed air line to vary the rate at which lubricant is introduced into the air line as required.

Some of the objects of the invention having been stated, other objects will appear as the description proceeds when taken in connection with the accompanying drawings, in which—

FIGURE 1 is an elevational view of a device for introducing liquid in mist or atomized form into a flowing fluid medium under pressure in accordance with the present invention, the device having a vertical metering tube for visually indicating the rate at which liquid is introduced into the flowing fluid medium;

FIGURE 2 is an elevational view of the device similar to that shown in FIGURE 1, but looking at the right-hand side of the device as shown in FIGURE 1;

FIGURE 3 is a transverse sectional view taken along the line 3—3 in FIGURE 1;

FIGURE 4 is a top plan view of the device as shown in FIGURE 2;

FIGURE 5 is an enlarged longitudinal vertical sectional view, partially broken away, taken along the line 5—5 in FIGURE 4 and looking in the direction of the arrows associated therewith;

FIGURE 6 is an enlarged fragmentary longitudinal vertical sectional view showing the adjustable restrictor valve assembly for varying the rate of liquid discharge from the device, taken along the line 6—6 in FIGURE 4 and looking in the direction of the arrows associated therewith; and FIGURE 7 is a further enlarged fragmentary vertical sectional view taken along the line 7—7 in FIGURE 5.

Referring more specifically to the drawings, the device illustrated therein finds its principal usefulness when connected in an air line between a compressor or other source of air under pressure and a pneumatically-operable tool, the device being adapted to introduce lubricant into the compressed air flowing through the air line comprising a system of hoses or pipes for powering the tool in order to provide lubrication for the tool. It should be understood, however, that in a general sense, the present invention may be described as a device for dispensing a selected amount of liquid into a flowing fluid medium.

Reference numeral 10 broadly designates the device according to the present invention which comprises a main body or housing 11 having a fluid passage 12 therethrough. The passage 12 includes a threaded inlet 13 and a threaded outlet 14 at its opposite ends, the inlet 13 being adapted to receive a pipe leading from a compressor or other source of fluid under pressure (not shown), and the outlet 14 being adapted to be connected to a pipe leading to a fluid-driven apparatus (not shown).

A constricted passage portion 15 of reduced diameter is provided in the passage 12 intermediate the inlet 13 and the outlet 14, the constricted intermediate passage portion 15 comprising a pair of upper and lower branch passages 16, 17 in the form of an upper extraction duct 16 of substantially smaller diameter than the remainder of the passage 12 and a lower valve-controlled port 17, respectively. It will be observed that the duct 16 and the port 17 provide communication between the inlet 13 and the outlet 14 of the passage 12. The port 17 is closed by a pressure-responsive valve 20 which opens in response to the flow of fluid under a predetermined pressure through the passage 12 from the inlet 13 therefor. The valve 20 is mounted within the port 17 by means of a spider element 21 which is transversely arranged within the passage 12 and secured to the internal port-defining bore surface of the housing 11 at the inlet end of the port 17.

The valve 20 comprises a valve stem 22 extending axially within the passage 12, the valve stem 22 having a threaded end of reduced diameter loosely penetrating a suitable aperture formed in the spider 21 and protruding therethrough toward the inlet 13. The valve stem 22 is secured to the spider 21 by means of a nut 23 threaded onto the threaded end of the stem 22 protruding from the spider 21, the nut 23 being threaded into abutment with the side of the spider 21 facing the inlet 13 for drawing a shoulder formed on the stem 22 at the juncture between its reduced threaded end and an intermediate stem portion against the opposite side of the spider 21 facing the outlet 14. An axially movable valve member 24 is mounted on the stem 22 so as to be disposed on the side of the spider 21 facing the outlet 14. The valve member 24 is biased axially along the stem 22 toward the spider 21 by suitable resilient means, such as a coil spring 25 encircling the stem 22 and having its opposite ends bearing against the valve member 24 and an enlarged head forming the other end of the stem 22.

The valve member 24 is provided with a beveled leading surface defining a frusto-conical valve surface 26 which is adapted to engage an internal annular shoulder or valve seat 27 formed in the housing 11 and extending radially inwardly within the port 17 adjacent the side of the spider facing the outlet 14. The valve seat 27 tapers inwardly so as to provide a seat surface complementary to the frusto-conical valve surface 26 on the valve member 24 for establishing a fluid-tight seal when the valve member 24 is biased against the valve seat 27 by the spring 25.

It will be understood that the constricted passage portion 15 intermediate the inlet 13 and the outlet 14 of the passage 12 causes a pressure drop in the fluid being transmitted through the passage to create a region of higher fluid pressure A in the passage 12 at the inlet side thereof and a region of lower fluid pressure B in the passage 12 at the outlet side thereof on opposite sides of the constricted passage portion 15.

A reservoir or receptacle 30 is disposed atop the housing 11 which forms the bottom wall of the reservoir 30. The reservoir 30 is adapted to contain a supply of liquid, such as a lubricant, to be dispensed in mist or droplet form into the passage 12 through which fluid under pressure is flowing as will be presently described. The reservoir 30 comprises a cylindrical wall 31 extending vertically above the housing 11, the cylindrical reservoir wall 31 being made of suitable transparent material capable of withstanding pressures of the magnitude with which the device 10 is designed to be used. The lower edge of the cylindrical reservoir wall 31 is received in an annular groove 32 formed in the upper side of the housing 11. A sealing gasket in the form of a resilient O-ring 33 is received in the groove 32 between the housing 11 and the cylindrical reservoir wall 31 to prevent leakage of liquid or pressure fluid between the housing 11 and the cylindrical reservoir wall 31.

A cover 34 for the reservoir 30 is mounted on the upper edge of the cylindrical reservoir wall 31, the lowermost surface of the cover 34 including an annular groove 35 for reception of the cylindrical reservoir wall 31, and a sealing gasket in the form of an O-ring 36 being received in the groove 35 between the cover 34 and the cylindrical reservoir wall 31 to prevent leakage of liquid or pressure fluid between the cover 34 and the cylindrical reservoir wall 31.

The cover 34 is held tightly against the upper edge of the cylindrical reservoir wall 31 by a segmental stud member 40 which extends vertically through a central aperture formed in the cover 34 and is secured at its lower end to the housing 11. The stud member 40 comprises interconnected top and bottom stud segments 41, 42 respectively. Referring first to the bottom stud segment 42, the bottom stud segment 42 is provided with upper and lower threaded ends of reduced diameter, the lower threaded end of the stud segment 42 being threadably received by a boss 43 integrally formed on the housing 11 and projecting upwardly from the upper side thereof centrally of the reservoir 30. The top stud segment 41 includes a lower end having a threaded bore for reception of the reduced upper threaded end of the bottom stud segment 42 to connect the top and bottom stud segments 41 and 42 so as to dispose their adjoining surfaces in flush relationship in the assembled stud member 40. The upper end of the top stud segment 41 protruding above the cover 34 is provided with an enlarged head 45 which bears against the cover 34, the cover 34 being suitably recessed about the aperture through which the stud member 40 extends for reception of a sealing gasket in the form of an O-ring 46 to provide a fluid-tight seal between the cover 34 and the head 45 of the stud member 40, thereby preventing escape of pressure from the reservoir 30 through the central aperture in the cover 34.

It will be noted that the stud member 40 includes a central axial passageway 47 extending vertically in the top and bottom stud segments 41, 42 thereof. The lower end of the passageway 47 at the lower threaded end of the bottom stud segment 42 leads into a vertical housing bore 48 in the central housing boss 43 for reception of the lower threaded end of the bottom stud segment 42. The vertical housing bore 48 connects with the passage 12 at its inlet side in the higher pressure region A and also with the inlet side of the extraction duct 16. A transverse opening 50 is formed through the enlarged head 45 of the stud member 40 and adjoins the upper end of the axial passageway 47 to provide communication therebetween. A passageway extension 51 is also provided in the top stud segment 41 of the stud member 40, one end of the passageway extension 51 communicating with the interior of the reservoir 30 at the upper end thereof beneath the cover 34 and the other end of the passageway extension 51 leading into the transverse opening 50 formed in the head 45 of the stud member 40 for connecting the passageway extension 51 to the passageway 47 through the linking portion of the transverse opening 50. Thus, it will be seen that the interior of the reservoir 30 communicates with the passage 12 formed in the housing 11 at the inlet side thereof in the higher pressure region A by means of the passageway extension 51, the linking portion of the transverse opening 50, the passageway 47 and the vertical housing bore 48.

A plug valve 52 is mounted for axial movement in the transverse opening 50, the plug valve 52 comprising a cylindrical valve body 53 and a pair of axially spaced sealing gaskets in the form of O-rings 54, 54 carried on the valve body 53. It will be noted that the valve body 53 has a smaller diameter than the diameter of the transverse opening 50 and is maintained in radially inwardly spaced relation to the bore surface defining the transverse opening 50 by the O-rings 54, 54 which form fluid-tight seals between the valve body 53 and the bore surface defining the transverse opening 50. The O-rings 54, 54 are so spaced on the valve body 53 to provide for connecting the passageway 47 with the passageway extension 51 through a linking portion of the transverse opening 50 which is bounded at each end by the O-rings 54, 54, when the plug valve 52 is in the position shown in FIGURE 5. The opposite ends of the valve body 53 carry snap rings 55, 55 forming restraining means to limit the axial movement of the plug valve 52 in the transverse opening 50. In the latter connection, each of the snap rings 55, 55 is adapted to abut a corresponding side of the head 45 on the stud member 40 upon manually moving the plug valve 52 to either extreme of its range of axial movement. As previously observed, when the plug valve 52 assumes the position shown in FIGURE 5, communication is established between the higher pressure region A in the passage 12 and the interior of the reservoir 30. Leakage of pressure fluid or liquid to the atmosphere from the passage 12 and the reservoir 30 is prevented by the O-rings 54, 54 flanking the upper ends of the passageway 47 and the passageway extension 51 which define the ends of the portion of the transverse opening 50 linking the passageway 47 and the passageway extension 51. Upon manually pushing the plug valve 52 from the position shown in FIGURE 5 to the right for disposing the left snap ring 55 against the side of the head 45 corresponding thereto, it will be seen that the O-rings 54, 54 flank only the upper end of the passageway 47, the O-rings 54, 54 being located on opposite sides thereof to prevent leakage of pressure fluid from the passage 12 to the atmosphere. This latter position of the plug valve 52 opens the passageway extension 51 to the atmosphere through the portion of the transverse opening 50 disposed to the left of the O-rings 54, 54, which is larger in diameter than the valve body 53. In this way, communication between the interior of the reservoir 30 containing the liquid and the atmosphere may be established.

The cover 34 for the cylindrical wall 31 of the reservoir 30 is provided with a threaded opening for reception of a filler cap 56 which may be removed to admit liquid to the interior of the reservoir 30 as required. An annular sealing grommet, such as an O-ring 57, is received within a suitable recess formed in the cover 34 bounting the threaded cap-receiving opening for sealing engagement with the filler cap 56 to provide a fluid-tight seal between the cover 34 and the cap 56 for preventing leakage of liquid or pressure fluid from the interior of the reservoir 30.

Referring to FIGURES 5 and 6, and in particular to FIGURE 6, it will be observed that the reservoir 30 is provided with a tortuous liquid discharge line 60 in its bottom wall formed by the housing 11, the discharge line 60 leading into the extraction duct 16. The liquid discharge line 60 comprises a vertically extending delivery passage 61 leading from the bottom wall of the reservoir 30 to a liquid-receiving chamber 62 extending transversely thereto, and concluding in an eduction passage 63 depending vertically from the inner end of the liquid-receiving chamber 62 into communication with the extraction duct 16 at a point intermediate its ends.

Means are provided to adjust the rate of discharge of liquid from the interior of the reservoir 30 through the discharge line 60. As seen in FIGURE 6, such means comprises a restrictor valve 64 which is mounted in the liquid-receiving chamber 62 intermediate the vertical delivery passage 61 and the vertical eduction passage 63. The restrictor valve 64 includes a valve bonnet 66 threadably received within a bore 65 of stepped configuration which is formed in the housing 11 so as to extend above the passage 12 transversely to the axis thereof, the bore 65 cooperating with the restrictor valve 64 to define the aforesaid liquid-receiving chamber 62. The valve bonnet 66 includes a peripheral annular groove 67 intermediate its ends to which are joined a plurality of radial port-holes 68 arranged circumferentially about the bonnet 66 and extending inwardly thereof to the hollow interior of the bonnet 66. The annular groove 67 is in alinement with the delivery passage 61 so as to provide communication between the delivery passage 61 and the interior of the bonnet 66. The bonnet 66 further includes an inwardly tapering orifice 70 leading from its hollow interior to the innermost portion of bore 65. A valve plunger in the form of a threaded screw 71 having a reduced end portion terminating in a tapering needle valve member 72 is threadably received within the bonnet 66 so as to dispose the needle valve member 72 in proximity to the orifice 70. It will be understood that manual rotation of the valve plunger 71 with respect to the bonnet 66 will cause the valve plunger 71 to be moved inwardly or outwardly with respect to the bonnet 66 to correspondingly increase or decrease the restriction of the orifice 70 by the needle valve member 72 for adjusting the rate of flow of liquid from the reservoir 30.

A check valve 73 disposed in the inner end of the stepped bore 65 closes tapered orifice 70 when the device 10 is not in use to prevent leakage of liquid from the reservoir 30. The check valve 73 comprises a ball 74 biased against the inner end of the bonnet 66 by a relatively weak resilient spring 75 to close the inner end of the orifice 70. The spring 75 is of a type easily overcome by a suction effect created in the eduction passage 63 of the liquid discharge line 60 when the device 10 is in operation as will be presently described to open the check valve 73 by withdrawing the ball 74 from the orifice 70.

It is contemplated by the present invention to provide a visible liquid metering means so as to enable a person viewing the device 10 to determine the rate of flow of liquid from the reservoir 30 into the passage 12 through which fluid under pressure is flowing. In this connection, it will be observed that a vertically extending metering tube 80 is mounted within the reservoir 30, the vertical tube 80 being constructed of suitable transparent material and preferably having a measuring scale extending the length thereof which is graduated in a plurality of equal units. As seen in FIGURE 6, the lower end of the tube 80 is disposed in overlying relation to the liquid discharge line 60 leading from the reservoir 30 to the lower pressure region B in the passage 12. Adjacent the lower end of the tube 80, a transverse orifice 81 is provided therethrough so as to admit liquid from the interior of the reservoir 30 into the tube 80 for forming a liquid column from which liquid is to be subsequently transmitted through the liquid discharge line 60 into the passage 12.

In operation, the reservoir 30 is filled with a liquid, such as a lubricant, by removing the filter cap 56 and admitting liquid to the interior of the reservoir 30. The valve plug 52 is then moved to the position shown in FIGURE 5, wherein the interior of the reservoir 30 communicates with the higher pressure region A in the passage 12. Upon transmitting fluid under pressure through the inlet 13 of the passage 12, a portion of the pressure fluid will be directed through the transverse bore 48 formed in the central housing boss 43, the passageway 47 and the passageway extension 51 connected to the passageway 47 by the linking portion of the transverse opening 50 into the interior of the reservoir 30 for imposing pressure upon the liquid contained in the reservoir 30.

Fluid flowing through the passage 12 is further directed through the extraction duct 16 at a rapid velocity due to the extreme reduction in diameter of the duct 16 as compared to the inlet side of the passage 12. As will be understood, the flow of fluid under pressure at a rapid velocity through the extraction duct 16 induces a suction effect in the eduction passage 63 communicating therewith to draw liquid from the liquid column in the tube 80 through the liquid discharge line 60 into the extraction duct 16 from where the liquid is dispersed into the lower pressure region B at the outlet side 14 of the passage 12 in mist or droplet form for mixing with the pressure fluid flowing through the passage 12.

The suction effect created in the eduction passage 63 by the flow of fluid under pressure through the extraction duct 16 is further enhanced by the opening of port 17 in the intermediate constricted passage portion 15 due to the impingement of pressure fluid against the valve member 24 under a pressure sufficient to compress the spring 25 for forcing the valve member 24 away from the valve seat 27. It will be understood that the spring 25 offers slight resistance and can be readily overcome by fluid pressure of low magnitude impinging upon the valve member 24 so as to open the port 17 to provide for flow of fluid under pressure therethrough into the lower pressure region B at the outlet side of the passage 12. As fluid under pressure flows through the open port 17 and passes into the outlet side of the passage 12, the flow of such fluid past the end of the extraction duct 16 communicating with the outlet 13 induces a second suction effect, this time in the extraction duct 16 itself which adds to the suction present in the eduction passage 63 to assist in withdrawing liquid from the liquid column in metering tube 80 through the discharge line 60.

When the device 10 is placed in continuous operation to automatically supply liquid in mist or droplet form to a flowing fluid medium being transmitted through the passage 12, the level of the liquid column in the vertical metering tube 80 stands below the level of the liquid in the reservoir 30 because of the continuous withdrawal of liquid from the liquid column in the tube 80 through the discharge line 60 to provide a measurable differential liquid level for indicating the quantity of liquid being dispersed into the flowing fluid medium over a predetermined period.

In the latter connection, the scale graduations on the vertical metering tube 80 enable one to readily determine the specific differential liquid level which is obtained by subtracting the lower level of the liquid column in the tube 80 from the higher level of liquid in the reservoir 30 for accurately establishing the rate at which liquid is being introduced into the flowing fluid medium. By suitably adjusting the position of the valve plunger 71 in the bonnet 66 to either increase or reduce the restriction of the tapered orifice 70 by the needle valve member 72, one can control the rate at which liquid is introduced into the flowing fluid medium by the device 10 to insure that a proper quantity of liquid is dispersed in the fluid. It will be understood that various sizes of the device 10 having differing dimensions, as to the reservoir 30 and metering tube 80 for example, can be readily calibrated to determine the rate of liquid dispersal according to a complete range of differential liquid values for each size of the device 10.

Thus, it will be seen that I have disclosed a device for accurately dispensing a liquid into a flowing fluid medium, wherein the rate of liquid introduced into the flowing fluid medium can be visually ascertained to enable one to readily adjust the rate at which the liquid is being dispersed into the fluid medium for maintaining the proper percentage of liquid therein.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a device for dispensing a liquid into a flowing fluid medium, (*a*) a reservoir for containing a supply of liquid, (*b*) a housing associated with said reservoir and provided with a passage therethrough for connection in a line through which a fluid medium is to flow, (*c*) the interior of said reservoir communicating with said passage through a connecting passageway for exposing the surface of the liquid in said reservoir to the pressure of the fluid medium, (*d*) said reservoir having a liquid discharge line communicating with said passage at a point beyond the connecting passageway between the interior of said reservoir and said passage, (*e*) a vertically extending tube mounted within said reservoir in covering relation to the liquid discharge line, (*f*) said tube having a transverse orifice extending through its wall adjacent the liquid discharge line to provide communication between the interior of said reservoir, the interior of said tube, and the liquid discharge line through the orifice in said tube, and (*g*) liquid from said reservoir being dispensed through said tube and said discharge line into said passage in response to the flow of fluid through said passage and past the point at which the liquid discharge line communicates therewith, (*h*) whereby the dispensing of liquid creates a differential liquid level between a higher level of liquid in the reservoir and a lower level of liquid in the tube to indicate the rate at which liquid from the reservoir is being introduced into the flowing fluid medium.

2. In a device for dispensing a liquid into a flowing fluid medium, (*a*) a reservoir for containing a supply of liquid, (*b*) a housing associated with said reservoir and provided with a passage therethrough for connection in a line through which a fluid medium is to flow, (*c*) means in said passage intermediate its ends defining a constricted passage portion to cause a pressure drop creating regions of higher and lower pressures in said passage on opposite sides of the constricted passage portion, (*d*) the interior of said reservoir communicating with the region of higher pressure in said passage through a connecting passageway for exposing the surface of the liquid in said reservoir to the higher pressure, (*e*) said reservoir having a liquid discharge line communicating with the region of lower pressure in said passage, (*f*) a vertically extending tube mounted within said reservoir in covering relation to the liquid discharge line, (*g*) said tube having a transverse orifice extending through its wall adjacent the liquid discharge line to provide communication between the interior of said reservoir, the interior of said tube, and the liquid discharge line through the orifice in said tube, and (*h*) liquid from said reservoir being dispensed through said tube and said discharge line into the region of lower pressure in said passage in response to the flow of fluid through said constricted passage portion from the region of higher pressure to the region of lower pressure in said passage, (*i*) whereby the dispensing of liquid creates a differential liquid level between a higher level of liquid in the reservoir and a lower level of liquid in the tube to indicate the rate at which liquid from the reservoir is being introduced into the flowing fluid medium.

3. In a device for dispensing a liquid into a flowing fluid medium, (*a*) a reservoir for containing a supply of liquid, (*b*) a housing disposed beneath said reservoir and provided with a passage therethrough for connection in a line through which a fluid medium is to flow, (*c*) means in said passage intermediate its ends defining a constricted passage portion to cause a pressure drop creating regions of higher and lower pressures in said passage on opposite sides of the constricted passage portion, (*d*) the upper end of said reservoir above the liquid level thereof communicating with the region of higher pressure in said passage through a connecting passageway for exposing the surface of the liquid in said reservoir to the higher pressure, (e) said reservoir having a liquid discharge line in its bottom wall communicating with the region of lower pressure in said passage,
(f) a vertically extending tube mounted within said reservoir on the bottom wall thereof in covering relation to the liquid discharge line,
(g) said tube having a transverse orifice extending through its wall adjacent the liquid discharge line to provide communication between the interior of said reservoir and the interior of said tube through the orifice in said tube for forming a visible liquid column in said tube,
(h) liquid from the liquid column in said tube being dispensed through said tube and said discharge line into the region of lower pressure in said passage in response to the flow of fluid through said constricted passage portion from the region of higher pressure to the region of lower pressure in said passage,
(i) the dispensing of liquid from the liquid column in said tube causing the liquid column to be lower than the liquid level in the reservoir to create a differential liquid level for indicating the rate at which liquid from the reservoir is being introduced into the flowing fluid medium.

4. In a device as defined in claim 3, further including
(j) manually adjustable means for regulating the differential liquid level to vary the rate of liquid being introduced into the flowing fluid medium.

5. In a device for dispensing a liquid into a flowing fluid medium,
(a) a reservoir having a transparent cylindrical wall for containing a supply of liquid,
(b) a housing defining the bottom wall of said reservoir and provided with a passage therethrough beneath said reservoir for connection in a line through which a fluid medium is to flow,
(c) means in said passage intermediate its ends defining a constricted passage portion to cause a pressure drop creating regions of higher and lower pressures in said passage on opposite sides of the constricted passage portion,
(d) the upper end of said reservoir above the liquid level thereof communicating with the region of higher pressure in said passage through a connecting passageway for exposing the surface of the liquid in said reservoir to the higher pressure,
(e) said reservoir having a liquid discharge line in its bottom wall communicating with the region of lower pressure in said passage,
(f) a vertically extending transparent cylindrical tube mounted within said reservoir on the bottom wall thereof in covering relation to the liquid discharge line,
(g) said tube having a uniform diameter and being provided with a transverse orifice extending through its wall adjacent the liquid discharge line to provide communication between the interior of said reservoir and the interior of said tube through the orifice in said tube for forming a visible liquid column in said tube,
(h) liquid from the liquid column in said tube being dispensed through said tube and said discharge line into the region of lower pressure in said passage in response to the flow of fluid through said constricted passage portion from the region of higher presure to the region of lower pressure in said passage, and
(i) the dispensing of liquid from the liquid column in said tube causing the liquid column to be lower than the liquid level in the reservoir to create a differential liquid level for indicating the rate at which liquid from the reservoir is being introduced into the flowing fluid medium.

6. In a device as defined in claim 5, further including
(j) a manually adjustable restrictor valve interposed in the liquid discharge line for regulating the dispensing of liquid therethrough to vary the rate of liquid being introduced into the flowing fluid medium,
(k) and the differential liquid level between said tube and said reservoir changing in response to variations in the rate of liquid being introduced into the flowing fluid medium for indicating the existing rate of such liquid dispersal.

References Cited in the file of this patent
UNITED STATES PATENTS

| | | |
|---|---|---|
| 1,621,771 | Egan | Mar. 22, 1927 |
| 2,524,878 | Boretti | Oct. 10, 1950 |
| 2,710,673 | Costes | June 14, 1955 |
| 2,913,234 | Beaurline | Nov. 17, 1959 |

FOREIGN PATENTS

| | | |
|---|---|---|
| 354,019 | France | July 13, 1905 |